United States Patent
Mohanty

(10) Patent No.: US 12,549,500 B2
(45) Date of Patent: Feb. 10, 2026

(54) TOPICAL AND CONTEXTUAL CONTENT FILTER FOR LARGE LANGUAGE MODEL CHATBOTS

(71) Applicant: Kyndryl, Inc., New York, NY (US)

(72) Inventor: Amarendra Kumar Mohanty, Hyderabad (IN)

(73) Assignee: Kyndryl, Inc., New York, NY (US)

( * ) Notice: Subject to any disclaimer, the term of this patent is extended or adjusted under 35 U.S.C. 154(b) by 1 day.

(21) Appl. No.: 18/645,541

(22) Filed: Apr. 25, 2024

(65) Prior Publication Data

US 2025/0337699 A1    Oct. 30, 2025

(51) Int. Cl.
G06F 15/16    (2006.01)
H04L 51/02    (2022.01)
H04L 51/216   (2022.01)

(52) U.S. Cl.
CPC ............ *H04L 51/02* (2013.01); *H04L 51/216* (2022.05)

(58) Field of Classification Search
CPC .............................. H04L 51/02; H04L 51/216
USPC ....................................................... 709/206
See application file for complete search history.

(56) References Cited

U.S. PATENT DOCUMENTS

| | | | |
|---|---|---|---|
| 10,366,168 B2 | 7/2019 | Wu | |
| 10,832,008 B2 | 11/2020 | Banerjee et al. | |
| 12,111,858 B1 * | 10/2024 | Radhakrishnan | G06F 16/31 |
| 2020/0034551 A1 * | 1/2020 | Cantrell | H04L 9/3247 |
| 2021/0295822 A1 | 9/2021 | Tomkins et al. | |
| 2023/0274094 A1 | 8/2023 | Tunstall-Pedoe et al. | |
| 2024/0412031 A1 * | 12/2024 | Rayman | G06N 20/00 |
| 2025/0045735 A1 * | 2/2025 | Araujo | G06Q 10/025 |
| 2025/0158942 A1 * | 5/2025 | Rodgers | G06F 40/20 |
| 2025/0190459 A1 * | 6/2025 | Conway | G06N 3/0475 |
| 2025/0245332 A1 * | 7/2025 | Cappel | G06F 21/57 |
| 2025/0252192 A1 * | 8/2025 | Blair | G06F 40/279 |
| 2025/0267214 A1 * | 8/2025 | Shim | H04M 3/4365 |

OTHER PUBLICATIONS

Iakovlev, Misha. "Guardrails for Large Language Models". Oct. 5, 2023. pp. 1-9 (Year: 2023).*
Jones, Steve. "Zero-Trust LLMs". Jan. 24, 2024. pp. 1-15. (Year: 2024).*

(Continued)

*Primary Examiner* — Imad Hussain
(74) *Attorney, Agent, or Firm* — CANTOR COLBURN LLP; Erik Swanson

(57) ABSTRACT

Computer-implemented methods for a topical and contextual content filter for large language model chatbots. Aspects include receiving a user query of a user from a chatbot application. Aspects also include receiving a previous chatbot application conversation associated with the user. Aspects further include determining that the user query of the user from the chatbot application is not a continuation of the previous chatbot application conversation associated with the user. Aspects also include identifying a short list of possible topics using the user query and a topic database. Aspects include determining that the user query of the user from the chatbot application is not associated with the short list of possible topics. Aspects further include transmitting a notification to the chatbot application comprising a rejection of the user query.

20 Claims, 6 Drawing Sheets

(56) References Cited

OTHER PUBLICATIONS

Lakovlev, Mlsha. "Guardrails for Large Language Models" Fuzzy Labs. pp. 1-9. Oct. 5, 2023. (Year: 2023).*

Anonymous, "Azure OpenAI content filter," Microsoft Learn, URL: https://learn.microsoft.com/en-us/azure/ai-services/openai/concepts/content-filter#configurability-preview, Retrieved: Feb. 15, 2024, 23 pages.

Anonymous, "NVIDIA / NeMo-Guardrails," GitHub, URL: https://github.com/NVIDIA/NeMo-Guardrails, Retrieved: Feb. 15, 2024, 8 pages.

Lao et al., "MDFB-Bot: A Practical Framework for Multi-Domain Task-Oriented Dialogue System," Data Intelligence, vol. 1, No. 2, 2019, pp. 176-186.

\* cited by examiner

TOPICAL AND CONTEXTUAL CONTENT FILTER FOR LARGE LANGUAGE MODEL CHATBOTS

BACKGROUND

The present invention generally relates to large language models, and more specifically, to computer-implemented methods, computer systems, and computer program products configured and arranged for a topical and contextual content filter for large language model chatbots.

A chatbot application, also known as a chatbot, is a software application that is designed to mimic a conversation through text or voice integration. A chatbot application is based on a large language model that enables users to direct a conversation towards a preferred format, style, level of detail, or the like. Chatbot applications use generative artificial intelligence systems to maintain a conversation with a user in natural language and simulate the behavior of a person during a conversation.

SUMMARY

Embodiments of the present invention are directed to computer-implemented methods for a topical and contextual content filter for large language model chatbots. A non-limiting computer-implemented method includes receiving a user query of a user from a chatbot application. The method includes receiving a previous chatbot application conversation associated with the user. The method further includes determining that the user query of the user from the chatbot application is not a continuation of the previous chatbot application conversation associated with the user. The method also includes identifying a short list of possible topics using the user query and a topic database. The method further includes determining that the user query of the user from the chatbot application is not associated with the short list of possible topics. The method also includes transmitting a notification to the chatbot application comprising a rejection of the user query.

In one embodiment of the present invention, identifying the short list of possible topics using the user query and the topic database further includes converting the user query to a user query vector embedding using an embedding model. The method also includes performing a vector search in the topic database using the user query vector embedding. The method further includes adding a predetermined number of the possible topics from the vector search in the topic database to the short list.

In one embodiment of the present invention, determining that the user query of the user from the chatbot application is not associated with the short list of possible topics further includes determining that the short list of the possible topics is not associated with the previous chatbot application conversation associated with the user.

In one embodiment of the present invention, the topic database is a vector database of topics provided by an administrator.

In one embodiment of the present invention, the method further includes receiving a different user query of a different user from the chatbot application. The method also includes receiving a previous chatbot application conversation associated with the different user. The method further includes determining that the different user query of the different user from the chatbot application is not a continuation of the previous chatbot application conversation associated with the different user. The method also includes identifying a different short list of possible topics using the different user query and the topic database. The method further includes selecting a topic associated with the different user query of the different user from the chatbot application from the different short list of possible topics using the previous chatbot application conversation associated with the different user. The method also includes transmitting the topic associated with the different user query to the chatbot application.

In one embodiment of the present invention, the method further includes determining that the user query of the user from the chatbot application is a continuation of the previous chatbot application conversation associated with the user. The method also includes generating a notification to the chatbot application comprising an indication that the user query is the continuation of the previous chatbot application conversation associated with the user.

In one embodiment of the present invention, the method further includes determining that the user query of the user from the chatbot application contains a word on a deny list. The method also includes generating a notification to the chatbot application comprising a rejection of the user query.

According to another non-limiting embodiment of the invention, a system is provided. The system includes a memory having computer readable instructions and one or more processors for executing the computer readable instructions, the computer readable instructions controlling the one or more processors to perform operations. The operations include receiving a user query of a user from a chatbot application. The operations include receiving a previous chatbot application conversation associated with the user. The operations further include determining that the user query of the user from the chatbot application is not a continuation of the previous chatbot application conversation associated with the user. The operations also include identifying a short list of possible topics using the user query and a topic database. The operations further include determining that the user query of the user from the chatbot application is not associated with the short list of possible topic. The operations also include transmitting a notification to the chatbot application comprising a rejection of the user query.

According to another non-limiting embodiment of the invention, a computer program product is provided. The computer program product includes a computer-readable storage medium having program instructions embodied therewith, the program instructions executable by a processor to cause the processor to perform operations. The operations include receiving a user query of a user from a chatbot application. The operations include receiving a previous chatbot application conversation associated with the user. The operations further include determining that the user query of the user from the chatbot application is not a continuation of the previous chatbot application conversation associated with the user. The operations also include identifying a short list of possible topics using the user query and a topic database. The operations further include determining that the user query of the user from the chatbot application is not associated with the short list of possible topic. The operations also include transmitting a notification to the chatbot application comprising a rejection of the user query.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
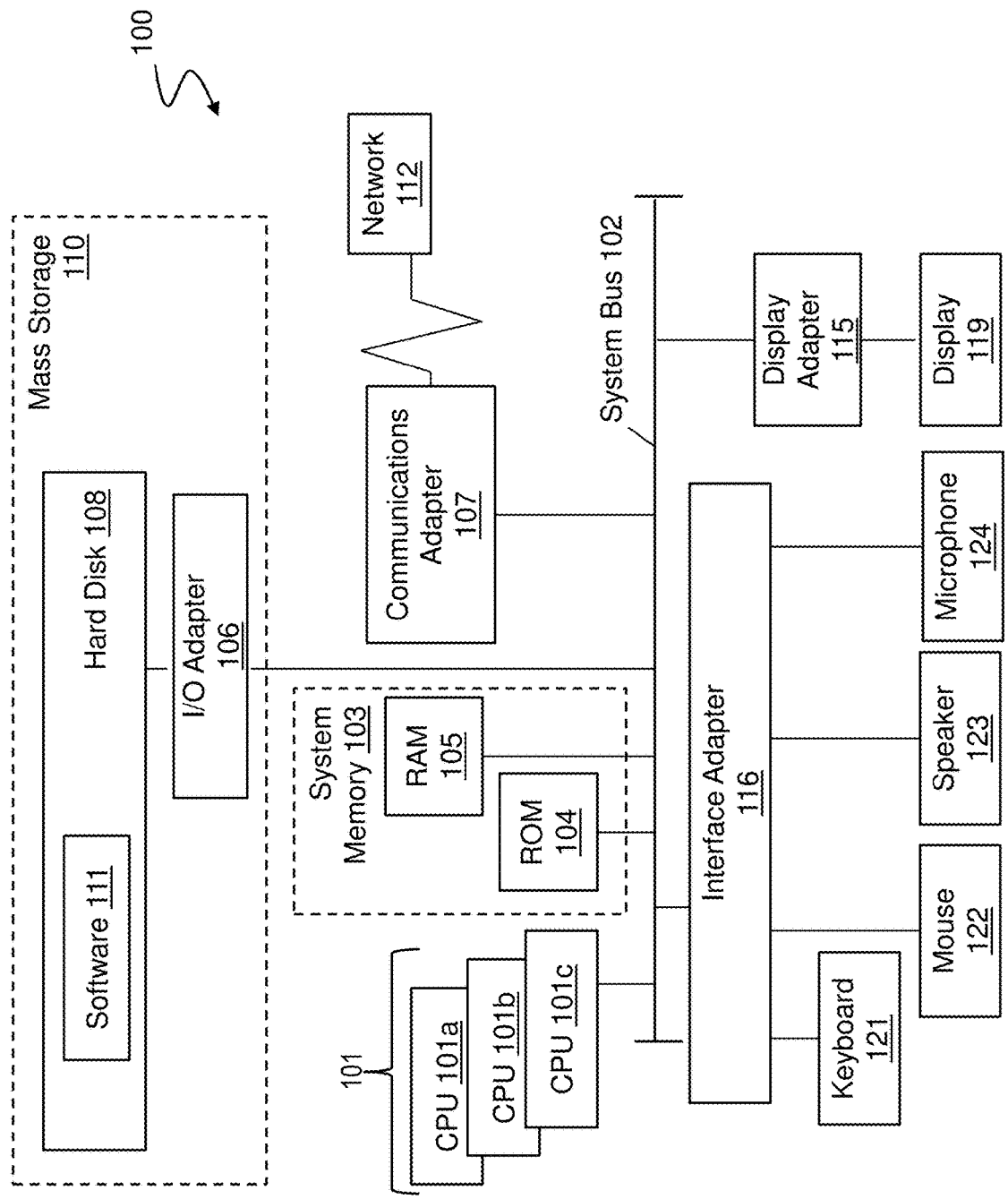
FIG. 1 depicts a block diagram of an example computer system for use in conjunction with one or more embodiments of the present invention.

Disclosed herein are methods, systems, and computer program products for a topical and contextual content filter for large language model (LLM) chatbot applications. As discussed above, chatbot applications are software applications based on large language models that are designed to simulate a conversation with a person. Chatbot applications use generative artificial intelligence systems to maintain a conversation with a user in natural language and mimic the behavior of a person during a conversation.

However, chatbot applications based on large language models used in corporate or other professional environments are difficult to control and keep focused on enterprise domain topics, especially during a free flow natural language conversation. Chatbot applications are also susceptible to artificial intelligence (AI) hallucinations. AI hallucinations occur when large language model chatbots perceive patterns or objects that are nonexistent or imperceptible to human observers and create outputs that are nonsensical or altogether inaccurate. Chatbot applications are also prone to prompt engineering jail break attempts to divert the chatbot applications away from business topics during conversations. Prompt engineering jail breaking is the process of using prompts to get chatbot applications to do or say unintended things. Generic content filters are not effective at keeping conversations with chatbot applications directed to specified topics or sustain or prolong contextual conversations.

The systems and methods described herein are directed to a topical and contextual content filter for large language model chatbots that are easy to implement, can handle a large number of approved topics, allow context switching, and keep context of past conversations intact while keeping the chatbot application consistently focused on approved topics. The systems and methods described herein enable contextual conversations on a large number of multi-domain topics and use LLMs for topical filtering. Additionally, the topical and contextual content filter for LLM chatbots enables multiple topics to be evaluated to determine if the topic of a user query is directed to an approved or non-approved topic.

The topical and contextual content filter for LLM chatbots uses LLMs to guard against non-topical conversations and uses vector embeddings to manage a large number of topics approved by an administrator of the system. The topical and contextual content filter for LLM chatbots is simple to implement and integrate into existing systems and maintains a contextual memory of previous conversations to provide additional data to use to determine if a current topic of a user query is an approved topic for discussion. The systems and methods described herein are resistant to prompt engineering jail break attempts and provide consistent topical evaluation of user queries to the chatbot application. The topical and contextual content filter for LLM chatbots can be integrated with a chatbot, such as an imported Python class. In some embodiments, the topical and contextual content filter can be run as an independent microservice accessible online.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Turning now to FIG. 1, a computer system 100 is generally shown in accordance with one or more embodiments of the invention. The computer system 100 can be an electronic computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, a desktop computer, a laptop computer, a tablet computer, or a smartphone. In some examples, the computer system 100 may be a cloud computing node. The computer system 100 may be described in the general context of computer system executable instructions, such as program modules, being executed by a computer system. Generally, program modules may include routines, programs, objects, components, logic, data structures, and so on that perform tasks or implement abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, a multi-core processor, a computing cluster, or any number of other configurations. The processors 101, also referred to as processing circuits, are coupled via a system bus 102 to a system memory 103 and various other components. The system memory 103 can include a read only memory (ROM) 104 and a random-access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

The software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
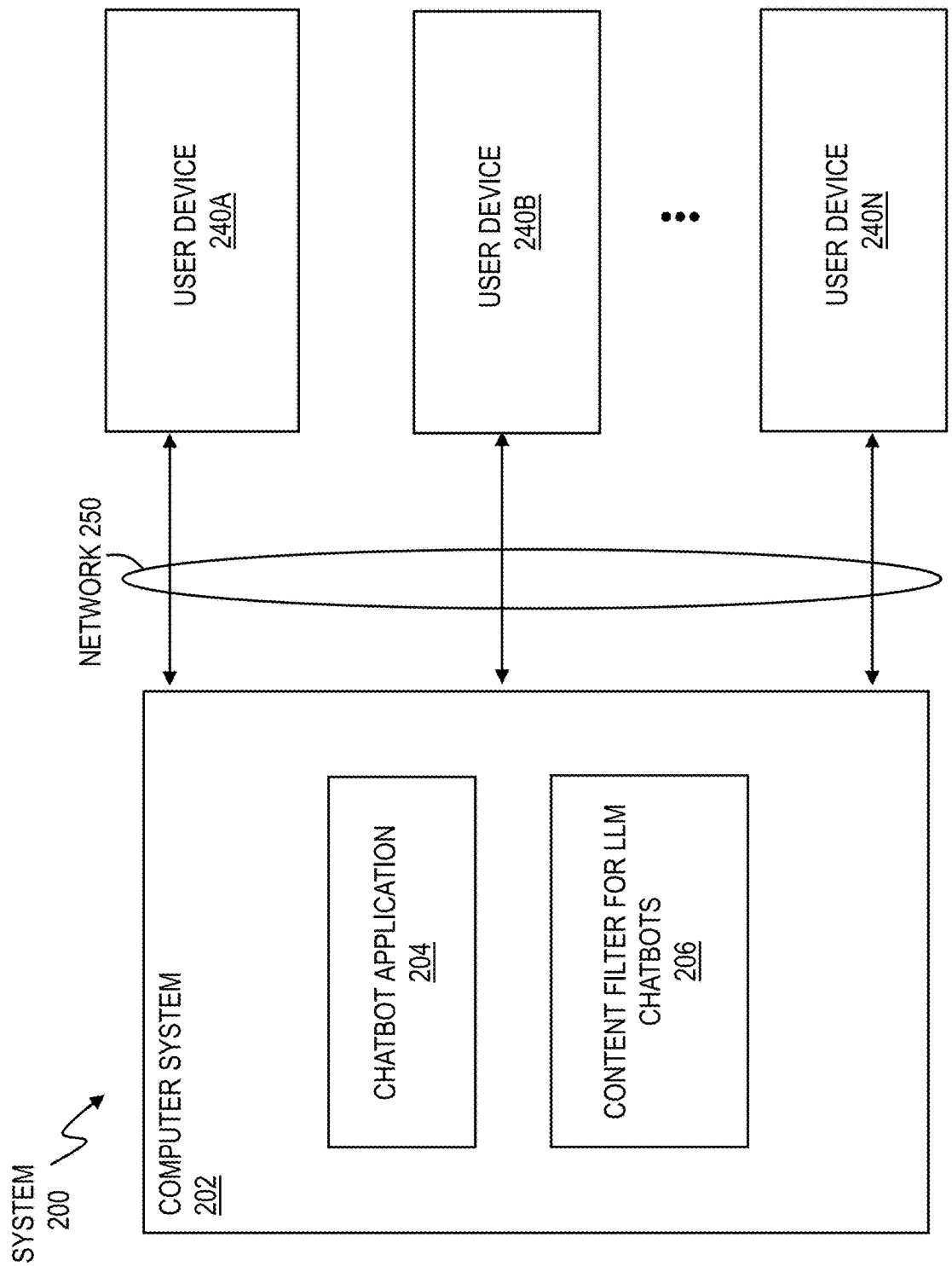
FIG. 2 depicts a block diagram of an example system for a topical and contextual content filter for large language model chatbots in a computing environment in accordance with one or more embodiments of the present invention.

FIG. 2 depicts a block diagram of an example system 200 for a topical and contextual content filter for LLM chatbots in a computing environment according to one or more embodiments. The system 200 includes a computer system 202 configured to communicate over a network 250 with many different user devices, such as a user device 240A, a user device 240B, through a user device 240N. The user devices 240A, 240B, through 240N can generally be referred to as user device 240 and are utilized to access the computing environment. The user device 240 can be a personal computer or laptop. The user device 240 can be a mobile device such as a cellular phone or tablet, or a smart device. A smart device is an electronic device, generally connected to other devices or networks via different wireless protocols that can operate to some extent interactively. Several notable types of smart devices are smartphones, smart speakers, tablets, smartwatches, smart bands, smart glasses, and many others.

The network 250 can be a wired and/or wireless communication network, and the communication network includes a telecommunications network, the public switched telephone network (PTSN), voice over IP (VOIP) network, etc. The communication network includes cellular networks, satellite networks, etc.

The user devices 240 can include various software and hardware components including software applications (apps) for communicating with one another over the network 250 as understood by one of ordinary skill in the art. The computer system 202, user device(s) 240, a chatbot application 204, a content filter for LLM chatbots 206, etc., can include functionality and features of the computer system 100 in FIG. 1, including various hardware components and various software applications, such as the software 111, which can be executed as instructions on one or more processors 101 in order to perform actions according to one or more embodiments of the invention. The chatbot application 204 and/or the content filter for LLM chatbots 206 can include, be integrated with, and/or call other pieces of software, algorithms, application programming interfaces (APIs), etc., to operate as discussed herein. In some embodiments, the content filter for LLM chatbots 206 is integrated with the chatbot application 204, such as an imported Python class. In some embodiments, the content filter for LLM chatbots 206 executes as an independent microservice accessible to the chatbot application 204 online, such as through HTTP.

The computer system 202 may be representative of numerous computer systems and/or distributed computer systems configured to provide a chatbot application 204 and a topical and contextual content filter for LLM chatbots 206 to one or more user devices 240. The computer system 202 can be part of a cloud computing environment such as a cloud computing environment 50 depicted in FIG. 5, as discussed further herein.

Figure 3:
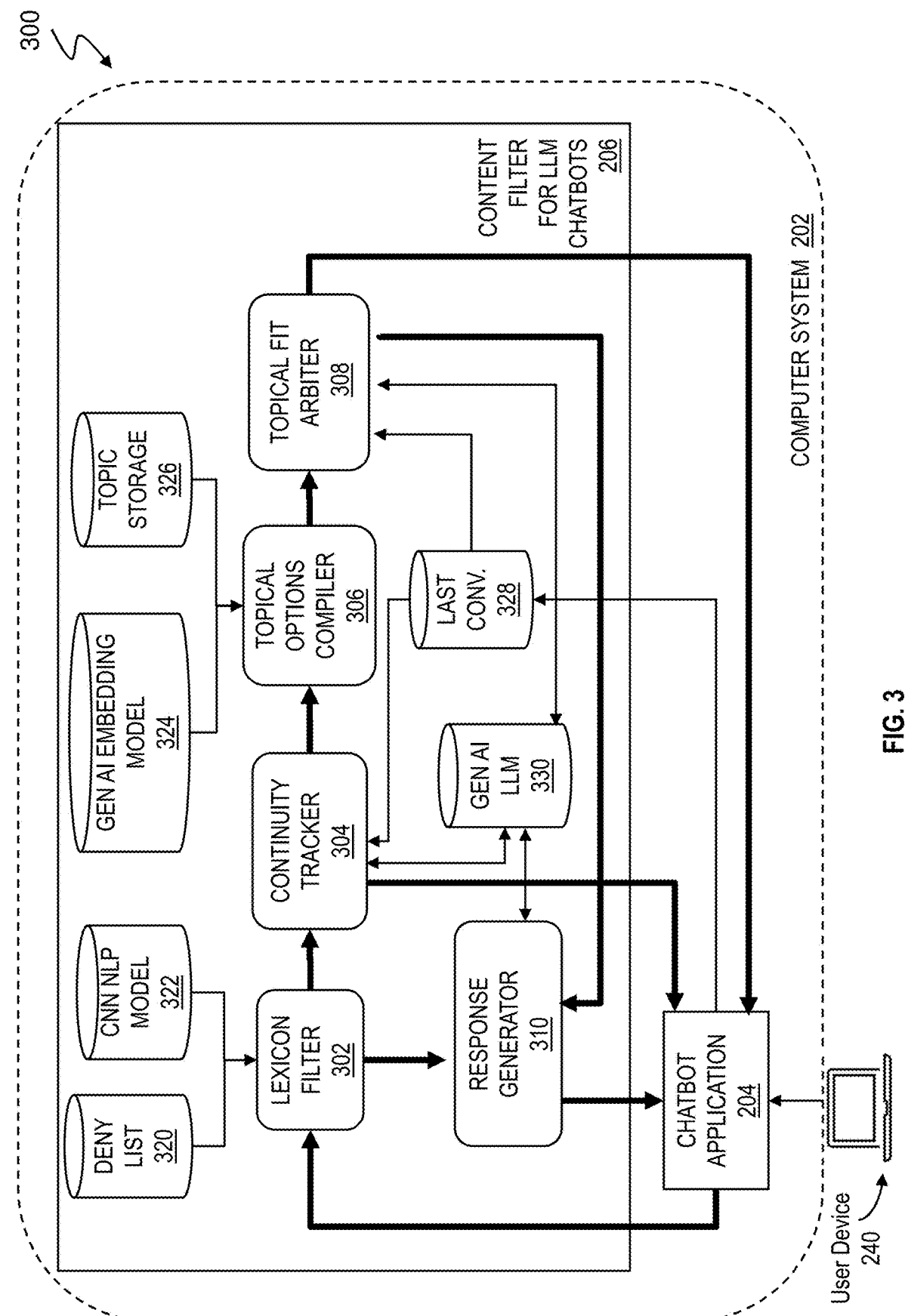
FIG. 3 is a data flow diagram for a topical and contextual content filter for large language model chatbots in a computing environment in accordance with one or more embodiments of the present invention.

In some embodiments, the computer system 202 can include one or more components for the topical and contextual content filter for LLM chatbots 206, as further discussed in relation to FIG. 3. For example, the computer system 202 can include a chatbot application 204 and a content filter for LLM chatbots 206, which can include different modules, such as a lexicon filter, continuity tracker, topical options compiler, topical fit arbitrator, and the like. In some embodiments, a user device, such as user device 240A, transmits a user query from a user to a chatbot application 204 of the computer system 202. The chatbot application 204 transmits the user query to the content filter for LLM chatbots 206. The content filter for LLM chatbots 206 receives the user query, analyzes the contents of the query, and determines whether the topic of the user query is approved for discussion with the chatbot application 204 or rejected as a non-approved topic with the chatbot application 204. The chatbot application 204 receives the determination of whether the topic of the user query is approved or rejected. If the topic of the user query is an approved topic, the chatbot application 204 continues its interaction with the user device 240A. However, if the topic of the user query is not an approved topic, the chatbot application 204 displays a notification that the topic is not an approved topic and discontinues any further discussion of the topic with the user device 240A.

Now referring to FIG. 3, a data flow diagram 300 for a topical and contextual content filter for LLM chatbots 206 in a computing environment is depicted. The user device 240 transmits a user query to a chatbot application 204 of the computer system 202. The user query can include prompts or questions that a user of the user device 240 asks a chatbot application 204. The chatbot application 204 transmits the user query to the content filter for LLM chatbots 206. In some embodiments, a lexicon filter 302 of the content filter for LLM chatbots 206 receives the user query from the chatbot application 204. The lexicon filter 302 transforms the user query for analysis. For example, the lexicon filter 302 removes stop words from the user query and lemmatizes nouns and verbs of the user query. Stop words are words in a stop list that are filtered out before or after processing natural language data because they are deemed insignificant. Lemmatization considers the context of a word or phrase and converts the word to its meaningful base form. In some embodiments, the lexicon filter 302 uses one or more convolutional neural network (CNN) natural language processing (NLP) models 322 to lemmatize the user query. In some embodiments, the lexicon filter 302 compares the lemmatized nouns and verbs from the user query to a deny list, such as deny list 320 to determine if the user query contains any topics that are prohibited. If the lexicon filter determines that the user query contains a prohibited topic using the deny list 320, the lexicon filter 302 transmits a notification to the response generator 310.

In some embodiments, the response generator 310 receives the notification from the lexicon filter 302 and generates a response or notification indicating that the user query is rejected. In some embodiments, the response generator 310 uses one or more general AI LLMs 330 to generate the response or notification. In some embodiments, the response or notification includes a statement indicating why the user query is rejected. The response generator 310 transmits the response or notification to the chatbot application 204, and the chatbot application 204 communicates to the user device 240 that the topic of the user query is prohibited and ceases any further discussion related to the user query.

In some embodiments, the lexicon filter 302 determines that the lemmatized user query does not contain any prohibited topics, such as by comparing the lemmatized words to the deny list 320 and transmits the user query to a continuity tracker 304 of the content filter for LLM chatbots 206.

The continuity tracker 304 of the content filter for LLM chatbots 206 checks if the user query in its original form is likely a continuation of the last conversation the user of the user device 240 had with the chatbot application 204. In some embodiments, the chatbot application 204 transmits the last conversation between the user and the chatbot application 204 to the content filter for LLM chatbots 206 where it is stored in a last conversation datastore 328. The continuity tracker 304 retrieves or otherwise obtains the last conversation of the user with the chatbot application 204 from the last conversation datastore 328 and uses the general AI LLM 330 to determine whether the user query is a continuation of the last conversation. For user queries that are determined to be a continuation of the last conversation, the continuity tracker 304 transmits the portion of the last conversation indicating the topic of the last conversation.

For example, the continuity tracker 304 transmits the user query part of the last conversation indicating the topic of the last conversation to the chatbot application 204.

In some embodiments, the continuity tracker 304 determines that the user query is not a continuation of the last conversation which is retrieved or obtained from the last conversation datastore 328. The continuity tracker 304 transmits the user query to the topical options compiler 306. The topical options compiler 306 receives the user query from the continuity tracker 304 and converts the user query into a vector embedding. A vector embedding is a numerical representation that captures the relationships and meanings of words, phrases, and other data types. In some embodiments, the topical options compiler 306 converts the user query into vector embeddings using AI, such as a general AI embedding model 324. The topical options compiler 306 performs a vector search in a vector database, such as topic storage 326, that can store a large number of approved topics. In some embodiments, the vector database, such as topic storage 326, is maintained by an administrator of the computer system 202. The topic storage 326 includes topics that are approved by the administrator of the computer system 202. Approved topics stored in the topic storage 326 can include topics related to the purpose or product of a company or organization that maintains the computer system 202, topics associated with the structures and processes of the company or organization, and the like.

In some embodiments, the topical options compiler 306 identifies a predetermined number of possible topics from the topic storage 326 and generates a short list. For example, an administrator of the computer system 202 designates that the short list of possible topics for the user query is the top three options from the search of the topic storage 326 using the vector embedding generated from the user query. The topical options compiler 306 transmits the short list of the possible topics for the user query to the topical fit arbiter 308.

The topical fit arbiter 308 receives the short list of the possible topics for the user query from the topical options compiler 306 and evaluates the complete user query against the short list. In some embodiments, the topical fit arbiter 308 uses AI, such as the general AI LLM 330 to determine whether the user query is associated with the short list of possible topics. In some embodiments, the topical fit arbiter 308 determines that the user query is associated with one or more of the possible topics of the short list. The selected topics from the short list are transmitted to the chatbot application 204. In some embodiments, the topical fit arbiter 308 determines that the user query is not associated with any of the topics from the short list and transmits a notification to the response generator 310.

In some embodiments, the topical fit arbiter 308 gives preference to decisions from previous vector searches performed by the topical options compiler 306 as the vector search results are more contextual when determining if the topic of the user query is associated with approved topics by the content filter for LLM chatbots 206. For example, if one of the results of the short list from the vector search is 'None' and topical fit arbiter 308 also determines that the user is not associated with an approved topic, the final result topic is designated as "none" and a notification is sent to the response generator 310. In some embodiments, if the topical fit arbiter 308 determines that the user query is not associated with an approved topic but the vector search is not showing a "none" option in the short list, the top most selection from vector search (e.g., from the short list) is selected as the topic of the user query and transmitted to the chatbot application 204.

In some embodiments, the response generator 310 receives the notification from the topical fit arbiter 308 and generates a response or notification indicating that the user query is rejected. In some embodiments, the response generator 310 uses one or more general AI LLMs 330 to generate the response or notification. In some embodiments, the response or notification includes a statement indicating why the user query is rejected. The response generator 310 transmits the response or notification to the chatbot application 204, and the chatbot application 204 communicates to the user device 240 that the topic of the user query is prohibited and ceases any further discussion related to the user query.

Figure 4:
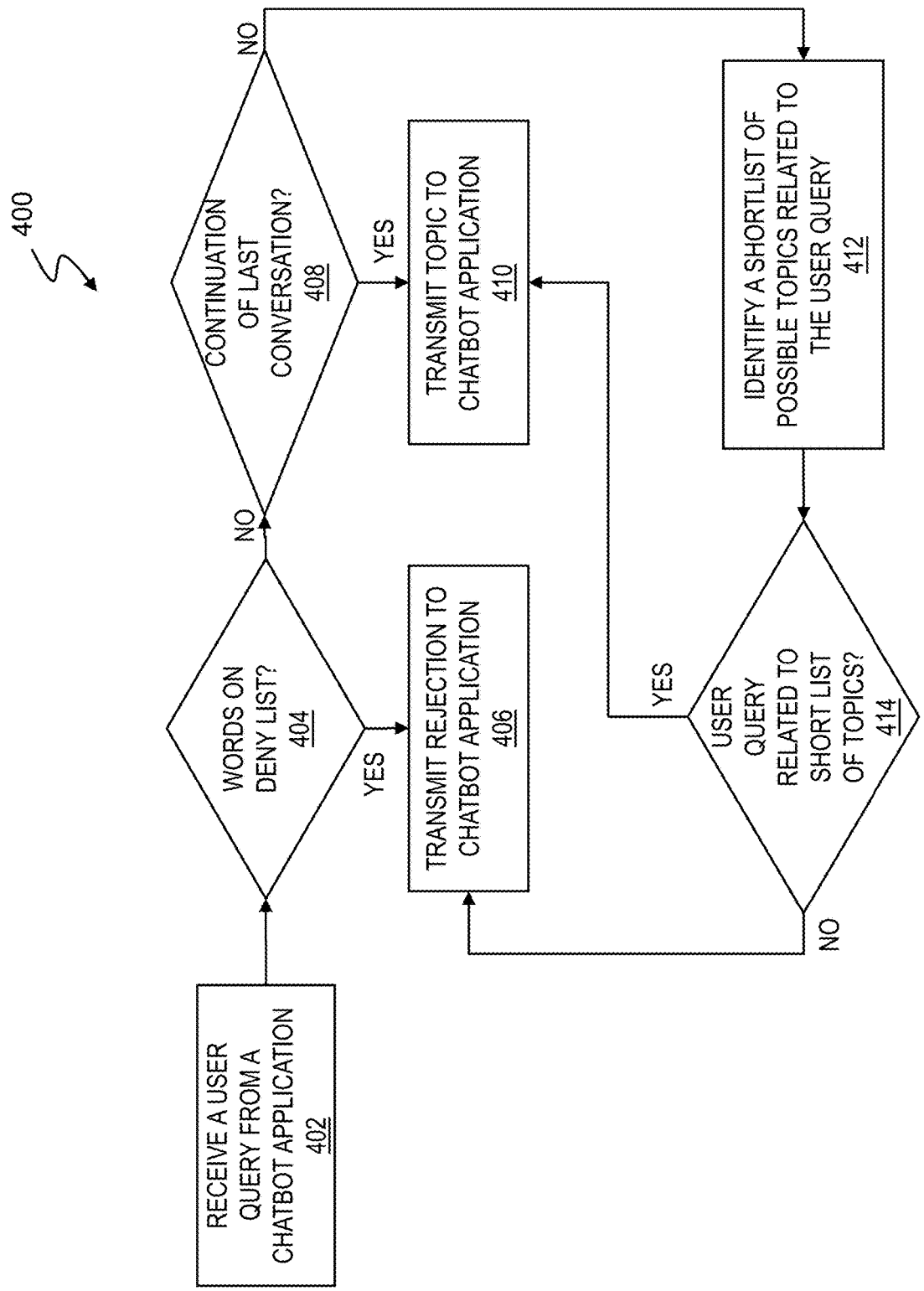
FIG. 4 is a flowchart of a computer-implemented method for a topical and contextual content filter for large language model chatbots in a computing environment in accordance with one or more embodiments of the present invention.

Now referring to FIG. 4, a flowchart depicts a computer-implemented method 400 for a topical and contextual content filter for LLM chatbots 206 in a computing environment. At block 402, the content filter for LLM chatbots 206 receives a user query from a chatbot application 204. In some embodiments, the lexicon filter 302 receives and processes the user query. For example, the lexicon filter 302 can remove stop words and lemmatize the words of the user query using, for example, a CNN NLP model 322.

At block 404, the content filter for LLM chatbots 206 determines whether the words of the processed user query are on the deny list 320 of the content filter for LLM chatbots 206. For example, the lexicon filter 302 compares the processed words of the user query to the deny list 320. If the lexicon filter 302 determines that the words of the processed user query are on the deny list 320, the method progresses to block 406. At block 406, the lexicon filter 302 transmits a notification to the response generator 310 of the content filter for LLM chatbots 206. The response generator 310 generates a response indicating that the user query is rejected. In some embodiments, the response generator 310 uses a general AI LLM 330 to generate a response indicating that the user query is rejected. In some embodiments, the response includes an indication that the user query is rejected due to words of the user query being on the deny list 320. The response generator 310 transmits the response to the chatbot application 204. The chatbot application 204 communicates to the user device 240 that the topic of the user query is prohibited and ceases any further discussion related to the user query.

In some embodiments, at block 404, if the lexicon filter 302 determines that the words of the processed user query are not on the deny list 320, the method progresses to block 408. At block 408, the content filter for LLM chatbots 206 determines whether the user query is a continuation of the last conversation of the user with the chatbot application 204. In some embodiments, the chatbot application 204 transmits all or a portion of the last conversation between the user and the chatbot application 204 to the content filter for LLM chatbots 206, where it is stored in a database, such as the last conversation datastore 328. In some embodiments, the content filter for LLM chatbots 206 receives and updates the last conversation datastore 328 using the most recent conversation between the user and the chatbot application 204.

In some embodiments, the continuity tracker 304 receives the user query from the lexicon filter 302 and checks if the user query in its original form is a continuation of the last conversation between the user and the chatbot application 204. The continuity tracker 304 retrieves or otherwise obtains the last conversation between the user and the chatbot application 204 from the last conversation datastore 328. The continuity tracker 304 uses a large language model, such as the general AI LLM 330, to determine whether the user query is a continuation of the last conversation. In some embodiments, the continuity tracker 304 determines that the user query is a continuation of the last conversation between the user and the chatbot application 204 and the method progresses to block 410.

At block 410, the continuity tracker 304 transmits the topic of the last conversation between the user and the chatbot application 204 to the chatbot application 204. The chatbot application 204 receives the topic from the last conversation between the user and the chatbot application 204 and continues to provide additional information requested in the user query.

In some embodiments, at block 408, the continuity tracker 304 determines that the user query is not a continuation of the last conversation between the user and the chatbot application 204 and the method progresses to block 412. At block 412, the content filter for LLM chatbots 206 identifies or generates a short list of possible topics related to the user query. In some embodiments, the continuity tracker 304 transmits the user query to the topical options compiler 306. The topical options compiler 306 converts the user query into a vector embedding. A vector embedding is a numerical representation that captures the relationships and meanings of words, phrases, and other data types. In some embodiments, the topical options compiler 306 converts the user query into vector embeddings using AI, such as the general AI embedding model 324. The topical options compiler 306 performs a vector search in a vector database, such as topic storage 326. In some embodiments, the topic storage 326 is maintained by an administrator of the computer system 202. In some embodiments, the topical options compiler 306 identifies a predetermined number of possible topics from the topic storage 326 and generates a short list. For example, an administrator of the computer system 202 designates that the short list of possible topics for the user query is the top three options from the search of the topic storage 326 using the vector embedding generated from the user query.

The method proceeds to block 414, where the content filter for LLM chatbots 206 determines whether the user query is related to the short list of topics from block 412. In some embodiments, the topical options compiler 306 transmits the short list of the possible topics for the user query to the topical fit arbiter 308. The topical fit arbiter 308 receives the short list of the possible topics for the user query from the topical options compiler 306. In some embodiments, the topical fit arbiter 308 evaluates the complete user query against the short list received from the topical options compiler 306. The topical fit arbiter 308 uses AI, such as the general AI LLM 330, to determine whether the user query is associated with the short list of possible topics. In some embodiments, if the topical fit arbiter 308 determines that the user query is associated with one or more of the possible topics of the short list, the method proceeds to block 410, where the selected topics from the short list are transmitted to the chatbot application 204. If the topical fit arbiter 308 determines that the user query is not associated with any of the topics from the short list, the method proceeds to block 406, where the content filter for LLM chatbots 206 transmits a rejection to the chatbot application 204.

In some embodiments, the topical fit arbiter 308 transmits a notification to the response generator 310. The response generator 310 generates a response or notification indicating that the user query is rejected. In some embodiments, the response generator 310 uses one or more general AI LLM 330 to generate the response or notification. In some embodiments, the response or notification includes a statement indicating why the user query is rejected. The response generator 310 transmits the response or notification to the chatbot application 204 and the chatbot application 204 communicates to the user device 240 that the topic of the user query is prohibited and ceases any further discussion related to the user query.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
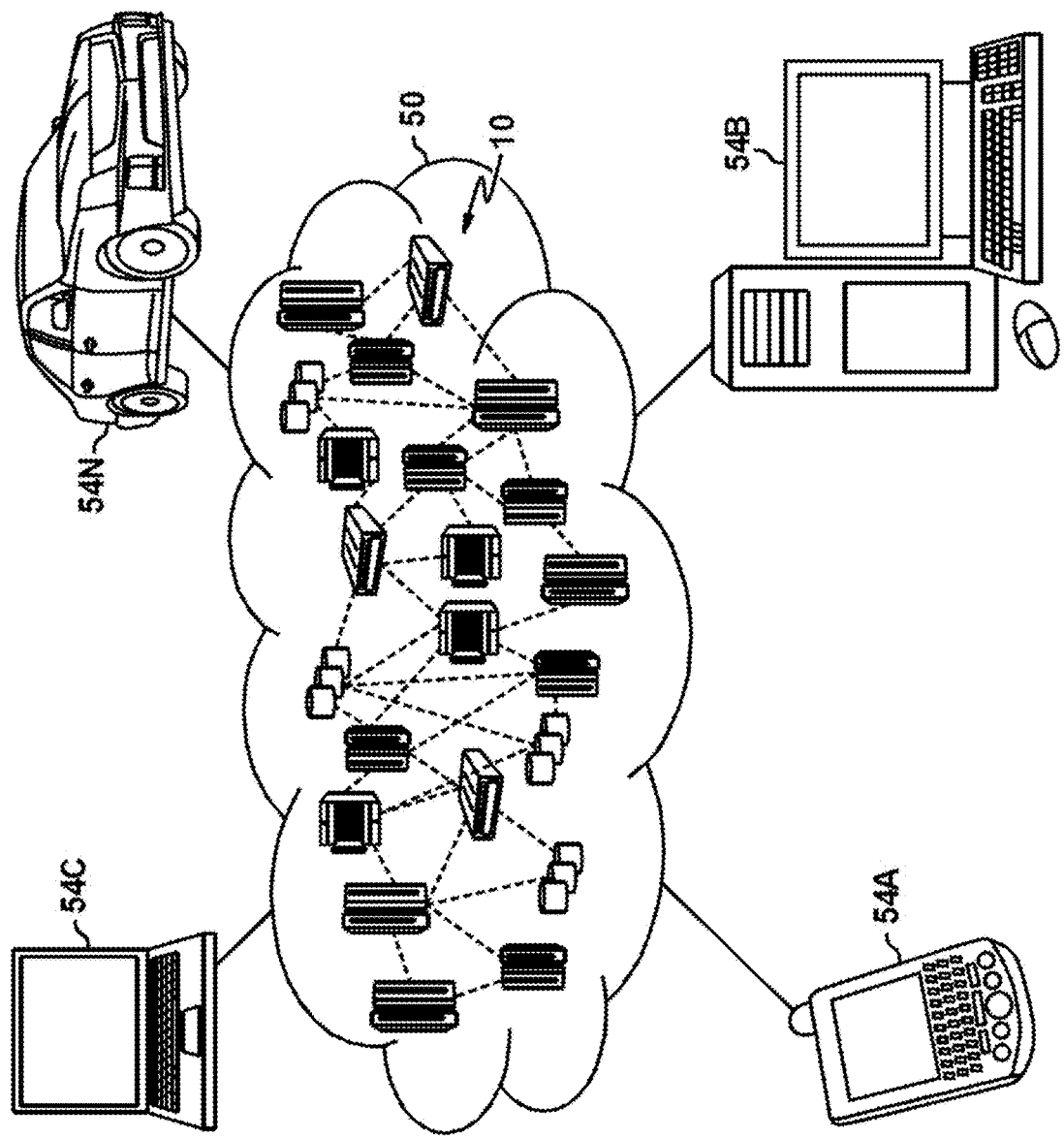
FIG. 5 depicts a cloud computing environment in accordance with one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
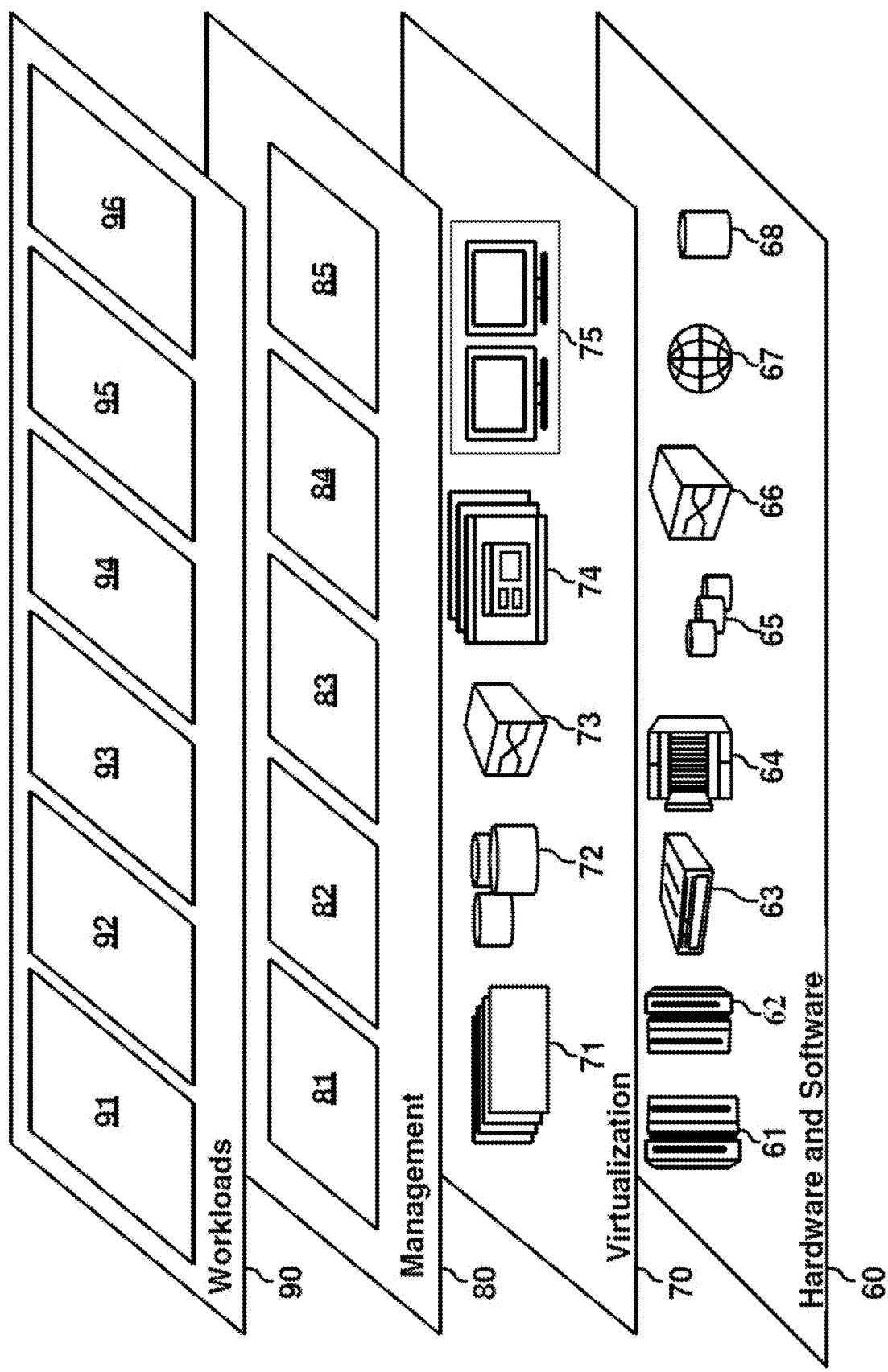
FIG. 6 depicts abstraction model layers in accordance with one or more embodiments of the present invention.

Referring now to FIG. 6, a set of functional abstraction layers provided by cloud computing environment 50 (depicted in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for the purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving a user query of a user from a chatbot application, the chatbot application being maintained by an organization;
    receiving a previous chatbot application conversation associated with the user;
    determining that the user query of the user from the chatbot application is not a continuation of the previous chatbot application conversation associated with the user;
    identifying a short list of possible topics using the user query and a topic database, wherein the short list of possible topics comprises approved topics for a purpose, a product, a structure, or a process of the organization;
    inputting, into an artificial intelligence (AI) model, the approved topics for the purpose, the product, the structure, or the process of the organization and the user query of the user in order to determine that the user query of the user from the chatbot application is not associated with the approved topics for the purpose, the product, the structure, or the process of the organization; and
    transmitting a notification to the chatbot application comprising a rejection of the user query.

2. The computer-implemented method of claim 1, wherein identifying the short list of possible topics using the user query and the topic database further comprises:
    converting the user query to a user query vector embedding using an embedding model;
    performing a vector search in the topic database using the user query vector embedding; and
    adding a predetermined number of the possible topics from the vector search in the topic database to the short list.

3. The computer-implemented method of claim 1, wherein determining that the user query of the user from the chatbot application is not associated with the short list of possible topics further comprises:
    determining that the short list of the possible topics is not associated with the previous chatbot application conversation associated with the user.

4. The computer-implemented method of claim 1, wherein the topic database is a vector database of topics provided by an administrator.

5. The computer-implemented method of claim 1, further comprising:
receiving a different user query of a different user from the chatbot application;
receiving a previous chatbot application conversation associated with the different user;
determining that the different user query of the different user from the chatbot application is not a continuation of the previous chatbot application conversation associated with the different user;
identifying a different short list of possible topics using the different user query and the topic database;
selecting a topic associated with the different user query of the different user from the chatbot application from the different short list of possible topics using the previous chatbot application conversation associated with the different user; and
transmitting the topic associated with the different user query to the chatbot application.

6. The computer-implemented method of claim 1, further comprising:
determining that the user query of the user from the chatbot application is the continuation of the previous chatbot application conversation associated with the user; and
generating a new notification to the chatbot application comprising an indication that the user query is the continuation of the previous chatbot application conversation associated with the user.

7. The computer-implemented method of claim 1, further comprising:
determining that the user query of the user from the chatbot application contains a word on a deny list; and
generating a new notification to the chatbot application comprising a rejection of the user query.

8. A system comprising:
a memory having computer readable instructions; and
one or more processors for executing the computer readable instructions, the computer readable instructions controlling the one or more processors to perform operations comprising:
receiving a user query of a user from a chatbot application, the chatbot application being maintained by an organization;
receiving a previous chatbot application conversation associated with the user;
determining that the user query of the user from the chatbot application is not a continuation of the previous chatbot application conversation associated with the user;
identifying a short list of possible topics using the user query and a topic database, wherein the short list of possible topics comprises approved topics for a purpose, a product, a structure, or a process of the organization;
inputting, into an artificial intelligence (AI) model, the approved topics for the purpose, the product, the structure, or the process of the organization and the user query of the user in order to determine that the user query of the user from the chatbot application is not associated with the approved topics for the purpose, the product, the structure, or the process of the organization; and
transmitting a notification to the chatbot application comprising a rejection of the user query.

9. The system of claim 8, wherein the operations to identify the short list of possible topics using the user query and the topic database further comprise:
converting the user query to a user query vector embedding using an embedding model;
performing a vector search in the topic database using the user query vector embedding; and
adding a predetermined number of the possible topics from the vector search in the topic database to the short list.

10. The system of claim 8, wherein the operations to determine that the user query of the user from the chatbot application is not associated with the short list of possible topics further comprise:
determining that the short list of the possible topics is not associated with the previous chatbot application conversation associated with the user.

11. The system of claim 8, wherein the topic database is a vector database of topics provided by an administrator.

12. The system of claim 8, wherein the operations further comprise:
receiving a different user query of a different user from the chatbot application;
receiving a previous chatbot application conversation associated with the different user;
determining that the different user query of the different user from the chatbot application is not a continuation of the previous chatbot application conversation associated with the different user;
identifying a different short list of possible topics using the different user query and the topic database;
selecting a topic associated with the different user query of the different user from the chatbot application from the different short list of possible topics using the previous chatbot application conversation associated with the different user; and
transmitting the topic associated with the different user query to the chatbot application.

13. The system of claim 8, wherein the operations further comprise:
determining that the user query of the user from the chatbot application is the continuation of the previous chatbot application conversation associated with the user; and
generating a new notification to the chatbot application comprising an indication that the user query is the continuation of the previous chatbot application conversation associated with the user.

14. The system of claim 8, wherein the operations further comprise:
determining that the user query of the user from the chatbot application contains a word on a deny list; and
generating a new notification to the chatbot application comprising a rejection of the user query.

15. A computer program product comprising a computer readable storage medium having program instructions embodied therewith, the program instructions executable by one or more processors to cause the one or more processors to perform operations comprising:
receiving a user query of a user from a chatbot application, the chatbot application being maintained by an organization;
receiving a previous chatbot application conversation associated with the user;

determining that the user query of the user from the chatbot application is not a continuation of the previous chatbot application conversation associated with the user;

identifying a short list of possible topics using the user query and a topic database, wherein the short list of possible topics comprises approved topics for a purpose, a product, a structure, or a process of the organization;

inputting, into an artificial intelligence (AI) model, the approved topics for the purpose, the product, the structure, or the process of the organization and the user query of the user in order to determine that the user query of the user from the chatbot application is not associated with the approved topics for the purpose, the product, the structure, or the process of the organization; and transmitting a notification to the chatbot application comprising a rejection of the user query.

16. The computer program product of claim 15, wherein the operations to identify the short list of possible topics using the user query and the topic database further comprise:

converting the user query to a user query vector embedding using an embedding model;

performing a vector search in the topic database using the user query vector embedding; and adding a predetermined number of the possible topics from the vector search in the topic database to the short list.

17. The computer program product of claim 15, wherein the operations to determine that the user query of the user from the chatbot application is not associated with the short list of possible topics further comprise:

determining that the short list of the possible topics is not associated with the previous chatbot application conversation associated with the user.

18. The computer program product of claim 15, wherein the topic database is a vector database of topics provided by an administrator.

19. The computer program product of claim 15, wherein the operations further comprise:

receiving a different user query of a different user from the chatbot application;

receiving a previous chatbot application conversation associated with the different user;

determining that the different user query of the different user from the chatbot application is not a continuation of the previous chatbot application conversation associated with the different user;

identifying a different short list of possible topics using the different user query and the topic database;

selecting a topic associated with the different user query of the different user from the chatbot application from the different short list of possible topics using the previous chatbot application conversation associated with the different user; and transmitting the topic associated with the different user query to the chatbot application.

20. The computer program product of claim 15, wherein the operations further comprise:

determining that the user query of the user from the chatbot application is the continuation of the previous chatbot application conversation associated with the user; and generating a new notification to the chatbot application comprising an indication that the user query is the continuation of the previous chatbot application conversation associated with the user.

* * * * *